E. B. McC. FENT AND G. W. CHANDLER.
WATER WHEEL.
APPLICATION FILED JAN. 10, 1918.
1,306,222.
Patented June 10, 1919.
2 SHEETS—SHEET 1.
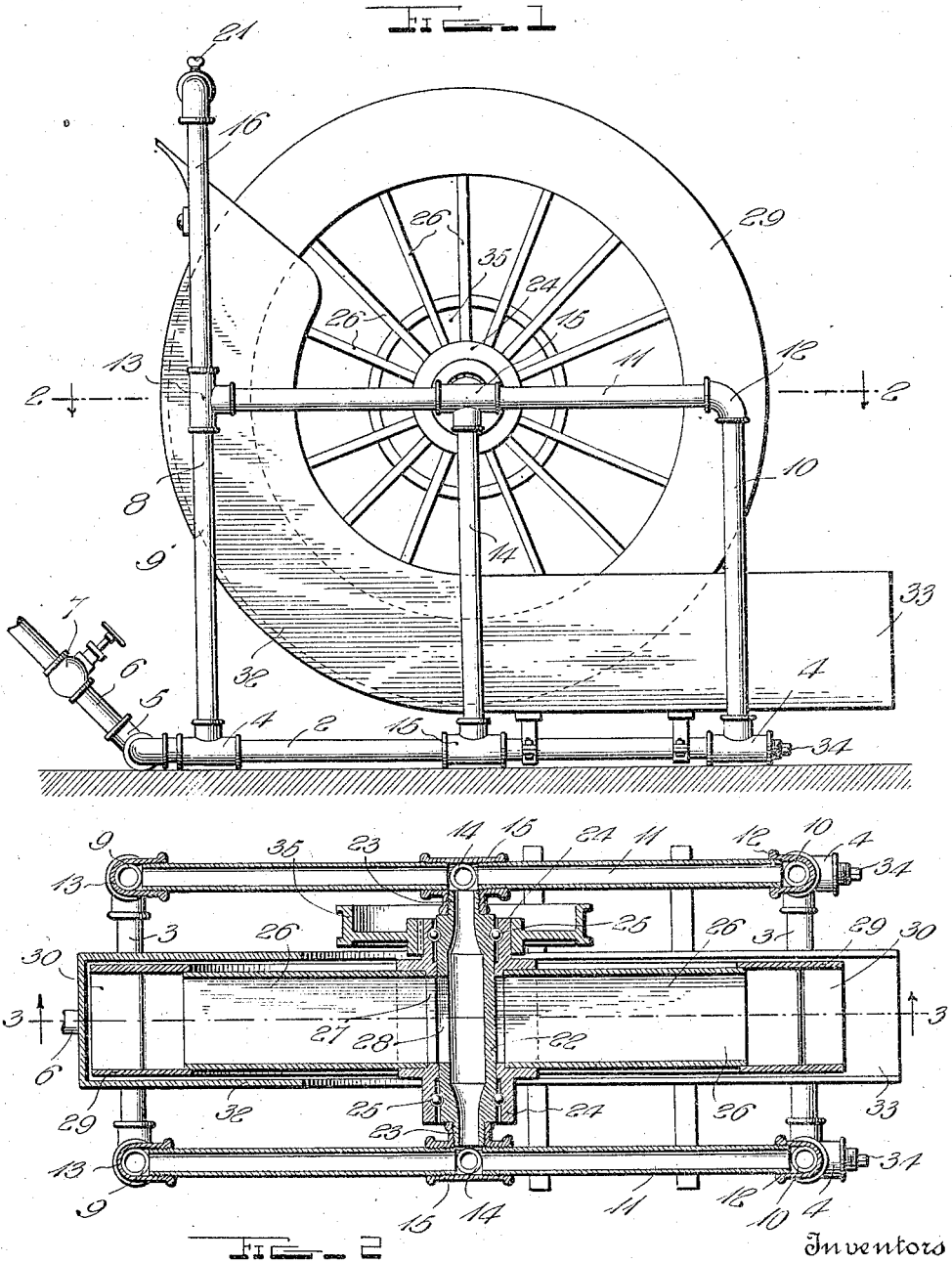
Witness
Inventors
E. B. M. Fent
G. W. Chandler
By
Attorneys

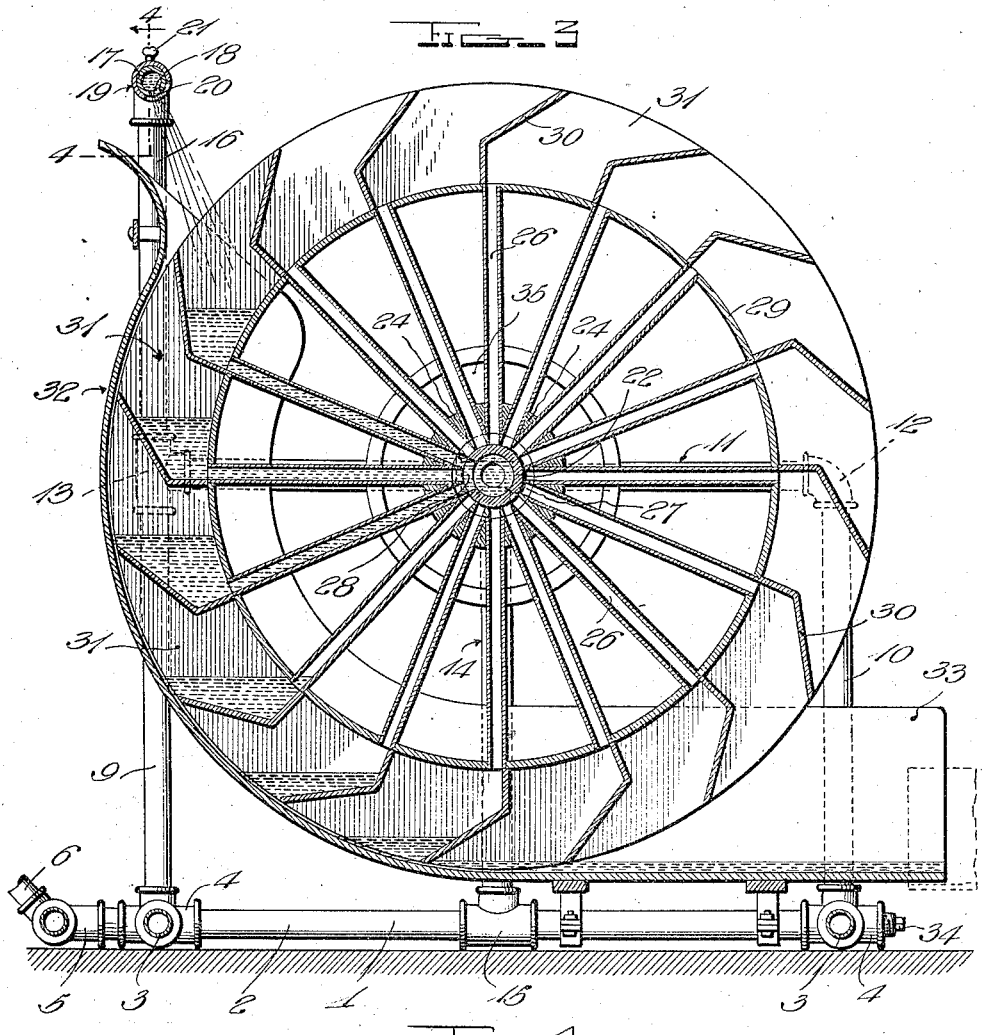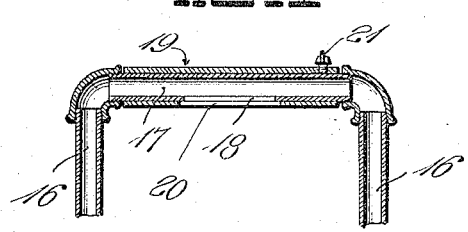

UNITED STATES PATENT OFFICE.

ELIJAH B. McCLELLEN FENT AND GEORGE W. CHANDLER, OF ANDERSON, INDIANA.

WATER-WHEEL.

1,306,222.   Specification of Letters Patent.   Patented June 10, 1919.

Application filed January 10, 1918. Serial No. 211,214.

*To all whom it may concern:*

Be it known that we, ELIJAH B. M. FENT and GEORGE W. CHANDLER, citizens of the United States, residing at Anderson, in the county of Madison and State of Indiana, have invented certain new and useful Improvements in Water-Wheels; and we do declare the following to be a full, clear, and exact description of the invention, such as will enable others skilled in the art to which it appertains to make and use the same.

The principal object of our invention is to provide a water wheel having an unusual amount of power, yet constructed in a comparatively simple and inexpensive manner.

In carrying out the above end, a further object is to construct the wheel supporting frame of piping and to utilize this piping for conducting water to the wheel for operating the latter.

Yet another object is to improve upon the wheel structure in such a manner as to turn the same not only by the weight of the water in a plurality of buckets or pockets, but by the impact caused by delivery of the water from the spokes of the wheel against substantially tangential plates at the rim thereof.

An additional object is to provide a water wheel in which the water is delivered not only through hollow spokes as above set forth, but from a point spaced outwardly from the periphery of the wheel.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a side elevation of the improved water wheel and its supporting means;

Fig. 2 is a horizontal section on the plane of the line 2—2 of Fig. 1;

Fig. 3 is a vertical section on the plane indicated by the line 3—3 of Fig. 2; and, Fig. 4 is an enlarged detail section on the plane indicated by the line 4—4 of Fig. 3.

In the drawings above briefly described, the numeral 1 designates a supporting base formed of a pair of longitudinal pipes 2, and a pair of transverse pipes 3, said longitudinal and transverse pipes being connected by suitable couplings 4. At 5, a water supply pipe 6 is connected to one of the transverse pipes 3, said pipe 6 being provided with one or more suitable valves 7 for controlling the supply of water.

A pair of side frames 8 rise from the base 1, each of said frames including vertical pipes 9 and 10 rising from the couplings 4, a horizontal pipe 11, an elbow 12 connecting the pipes 10 and 11, a T-coupling 13 connecting pipes 9 and 11, a vertical pipe 14 extending between the center of pipe 11 and the side pipe 2 below it, and T-couplings 15 connecting the ends of pipe 14 with said pipes 11 and 2. Other pipes 16 rise from the couplings 13 and are connected at their upper ends by a transverse horizontal pipe 17 having a slot 18 for the discharge of water as shown in Fig. 3, the amount of discharge being regulated by a sleeve 19 surrounding said pipe 17 and having a slot 20 to register a suitable amount with slot 18. A set screw or the like 21 may be employed for holding sleeve 19 in any adjusted position.

A tubular axle 22 extends between the couplings 15 and the ends of said axle are threaded into said couplings as at 23, whereby the axle is supported by the pipe structure and may be supplied with water therefrom. A hub 24 rotatably surrounds the axle 22 and appropriate ball bearings 25 are preferably interposed between the ends of said hub and axle as indicated in Fig. 2. Flat hollow spokes 26 radiate from the hub 24 and at their inner ends communicate with slots 27 formed therein, said slots being adapted for successive registration with a larger slot 28 in the axle 22 as will be clear from Figs. 2 and 3.

The outer ends of the spokes 26 are joined to a channel shaped rim 29, said rim having a plurality of transverse angular partitions 30 which divide it into a number of water pockets or buckets 31, said spokes discharging into said buckets at the inner ends of the partitions as featured in Fig. 3.

By the arrangement shown and described, the spokes 26 will successively register with the slots 28 and thus the water pressure supplied to the axle 22 from the frame structure, will be forcibly discharged through these spokes. This water strikes the substantially tangential partitions and the impact thus tends to turn the wheel. Furthermore, the water collects in the pockets 31 and exerts its weight to operate the device.

At the same time, a stream of water may be forced into the buckets and against the partitions 30 from the slots 18 and 20 as will be clear from Fig. 3. The result is that considerably greater power is derived from the present invention than from previous devices.

To prevent loss of water and to confine such water around the downwardly moving half of the wheel, an arcuate trough 32 is provided, said trough terminating in either a horizontal or inclined portion 33 for conducting the used water from the wheel.

At times the pipe structure may become clogged with mud and the like and in order that any such deposits may be readily removed, the couplings 4 remote from the supply pipe 6, are provided with removable plugs 34. When these plugs are removed, the entire frame structure may be flushed internally and thus any foreign matter may be readily removed.

Any preferred means could well be employed for taking power from the wheel, but for illustrative purposes we have shown a pulley 35 secured to one end of the hub 24. This pulley may drive a belt for performing numerous kinds of work.

From the foregoing, taken in connection with the accompanying drawings, it will be obvious that although our invention is of extremely simple and inexpensive nature, it will be highly efficient and durable. Particular emphasis is laid upon the two-fold function of the frame structure formed of piping, that is to support the wheel and at the same time conduct the water for running such wheel. The unique construction of the wheel itself however and the arrangement of pipes provided with the slot 18 are also highly important features. When the speed or power of the wheel is to be reduced, the active size of slot 18 may be correspondingly reduced by means of the sleeve 19, or this sleeve may be employed for totally checking the outrush of water from said slot. Also, the supply of water to the entire device may be controlled by the valve 7 or by any other means which may be employed for this purpose.

Since probably the best results are obtained from the several specific details shown and described, these details are preferably employed, but within the scope of the invention as claimed, numerous minor changes may well be made.

We claim:

1. The combination with a water wheel, of a horizontal base frame formed of piping and having a water inlet, and a pair of side frames rising from said base frame and also formed of piping, the piping of said side frames communicating with that of said base frame and the former serving to discharge the water to operate said wheel.

2. In combination, a supporting structure including a pair of opposed pipe couplings and means for supplying water thereto, a tubular axle having its ends threaded into said couplings and supported thereby, said axle having a water outlet, and a water wheel rotatably mounted on said axle and operated by the water discharged from said outlet.

3. In combination, a trough-shaped wheel rim having a plurality of substantially tangential partitions dividing it into a multiplicity of circumferentially spaced water buckets, hollow spokes secured at their outer ends to said rim, said spokes communicating with said buckets at the inner ends of said partitions, a hub from which said spokes radiate, and means for supplying water to said hub.

4. The combination with a water wheel having water buckets at its periphery and hollow spokes for supplying water to said buckets; of an auxiliary water supply means spaced outwardly from the periphery of said wheel and discharging into said buckets.

5. In combination, a supporting frame including a pair of side frames formed of piping and means for supplying water to said piping, a tubular axle extending between and communicating with said side frames to receive water therefrom, said axle having a water discharging opening, a water wheel rotatably mounted upon said axle and having water buckets at its periphery and hollow spokes for conducting water from said axle to said buckets, and an arched frame formed of piping and rising from said side frames in communication therewith, the crown of said arched frame having a water discharging opening adjacent said buckets.

6. The combination with a water wheel, of an arched frame formed of piping and having its crown disposed adjacent the periphery of said wheel and formed with a water discharge opening, together with a sleeve rotatable upon said crown and having an opening for total or partial registration with said first named opening, and means for holding said sleeve against rotation.

In testimony whereof we have hereunto set our hands in the presence of two subscribing witnesses.

ELIJAH B. McCLELLEN FENT.
GEORGE W. CHANDLER.

Witnesses to first signature:
SAMUEL CAY,
LEONARD COX.

Witnesses to second signature:
BERNARD B. McCANDLISS,
MARY J. LAWRENCE.

Copies of this patent may be obtained for five cents each, by addressing the "Commissioner of Patents, Washington, D. C."